(12) United States Patent
Janssen et al.

(10) Patent No.: US 7,992,272 B2
(45) Date of Patent: Aug. 9, 2011

(54) METHOD AND APPARATUS FOR MILLING THERMAL BARRIER COATED METALS

(75) Inventors: Joseph W. Janssen, Lambertville, NJ (US); John Malek, Old Bridge, NJ (US)

(73) Assignee: Metem Corporation, Parsippany, NJ (US)

( * ) Notice: Subject to any disclaimer, the term of this patent is extended or adjusted under 35 U.S.C. 154(b) by 1014 days.

(21) Appl. No.: 11/807,582

(22) Filed: May 29, 2007

(65) Prior Publication Data

US 2008/0298920 A1    Dec. 4, 2008

(51) Int. Cl.
B23P 23/00    (2006.01)
(52) U.S. Cl. .... 29/56.5; 29/558; 29/889.721; 219/69.17
(58) Field of Classification Search ............ 29/557–558, 29/889.721, 889.82, 889.71, 889.7, 33 R, 29/56.5, 26 A, 560; 219/69.17, 69.15; 408/1 R, 408/700, 701, 10–12, 22, 24
See application file for complete search history.

(56) References Cited

U.S. PATENT DOCUMENTS

| | | |
|---|---|---|
| 4,459,190 A | 7/1984 | Inoue |
| 4,596,066 A | 6/1986 | Inoue |
| 4,762,464 A * | 8/1988 | Vertz et al. ............... 29/889.721 |
| 4,808,785 A * | 2/1989 | Vertz et al. ................. 219/69.17 |
| 4,818,834 A * | 4/1989 | Rupert ....................... 219/69.17 |
| 4,891,485 A | 1/1990 | Briffod |
| 4,990,737 A | 2/1991 | Obara |
| 4,992,639 A | 2/1991 | Watkins et al. |
| 5,006,685 A | 4/1991 | Hatano et al. |
| 5,045,664 A | 9/1991 | Nakagawa et al. |
| 5,216,808 A | 6/1993 | Martus et al. |
| 5,418,345 A | 5/1995 | Adamski |
| 6,362,446 B1 | 3/2002 | Jones et al. |
| 6,368,060 B1 * | 4/2002 | Fehrenbach et al. ........ 416/97 R |
| 6,383,602 B1 | 5/2002 | Fric et al. |
| 6,420,677 B1 * | 7/2002 | Emer et al. ............... 219/121.71 |
| 6,573,474 B1 * | 6/2003 | Loringer ................... 29/889.721 |
| 6,590,178 B2 * | 7/2003 | Shih ............................. 219/69.2 |
| 6,847,004 B2 * | 1/2005 | Das et al. ................. 219/121.71 |
| 6,897,401 B2 * | 5/2005 | Kildea ........................ 219/69.17 |
| 6,935,003 B2 | 8/2005 | Rahman et al. |

(Continued)

FOREIGN PATENT DOCUMENTS

DE    4326517 A1 *    2/1995

(Continued)

OTHER PUBLICATIONS

European Search Report issued on Aug. 5, 2008 in connection with corresponding European Application No. EP 08 00 9753.

*Primary Examiner* — Erica E Cadugan
(74) *Attorney, Agent, or Firm* — Lerner, David, Littenberg, Krumholz & Mentlik, LLP

(57) ABSTRACT

A method is provided for milling a thermal barrier coated metal part. This method includes selectively removing a portion of a ceramic coating using a mechanical cutting tool, thereby forming a counterbore, and machining the metal part through the counterbore. A drilling head for drilling thermal barrier coated metal parts is also provided. The drilling head comprises a mechanical cutting tool, which is operable to mill through ceramic, and an electrode for electrical discharge machining. The electrode may be used to mill the metal part, and may be interchangeable with the mechanical cutting tool.

15 Claims, 8 Drawing Sheets

U.S. PATENT DOCUMENTS

| | | | |
|---|---|---|---|
| 7,041,933 B2 * | 5/2006 | Forrester et al. | 219/69.17 |
| 2003/0102287 A1 | 6/2003 | Katsumata et al. | |
| 2004/0168288 A1 | 9/2004 | Rahman et al. | |
| 2005/0013994 A1 | 1/2005 | Strangman | |
| 2005/0173388 A1 | 8/2005 | Lavers et al. | |

FOREIGN PATENT DOCUMENTS

| | | |
|---|---|---|
| EP | 366466 | 5/1990 |
| EP | 491242 | 6/1992 |
| EP | 1043480 | 10/2000 |

* cited by examiner

METHOD AND APPARATUS FOR MILLING THERMAL BARRIER COATED METALS

BACKGROUND OF THE INVENTION

Thermal barrier coating (TBC) systems have come to be widely used, particularly with respect to aircraft engines and industrial gas turbines. TBC systems typically include a coating of non-conductive material, such as ceramic, secured to a metal part, such as a turbine blade or a turbine vane, by a bonding coat. The ceramic coating insulates the metal part from hot combustion gases. Further insulation is typically provided by cooling holes, which are drilled through the part to provide a film of air on surfaces exposed to hot combustion gases. Known methods of manufacturing the cooling holes (e.g., laser drilling, abrasive water jets) can be very expensive or difficult to perform with requisite accuracy. Moreover, these methods may damage the ceramic coating. Accordingly, a cost effective and accurate method of machining cooling holes through thermal barrier coated parts is desired.

SUMMARY OF THE INVENTION

One aspect of the invention provides a method for milling a thermal barrier coated metal part. This method includes selectively removing a portion of a ceramic coating using a mechanical cutting tool, thereby forming a counterbore, and machining the metal part through the counterbore.

Another aspect of the invention provides a drilling head for drilling thermal barrier coated metal parts. The drilling head comprises a mechanical cutting tool, which is operable to mill through ceramic, and an electrode for electrical discharge machining. The electrode may be used to mill the metal part, and may be interchangeable with the mechanical cutting tool.

DETAILED DESCRIPTION

Figure 1:
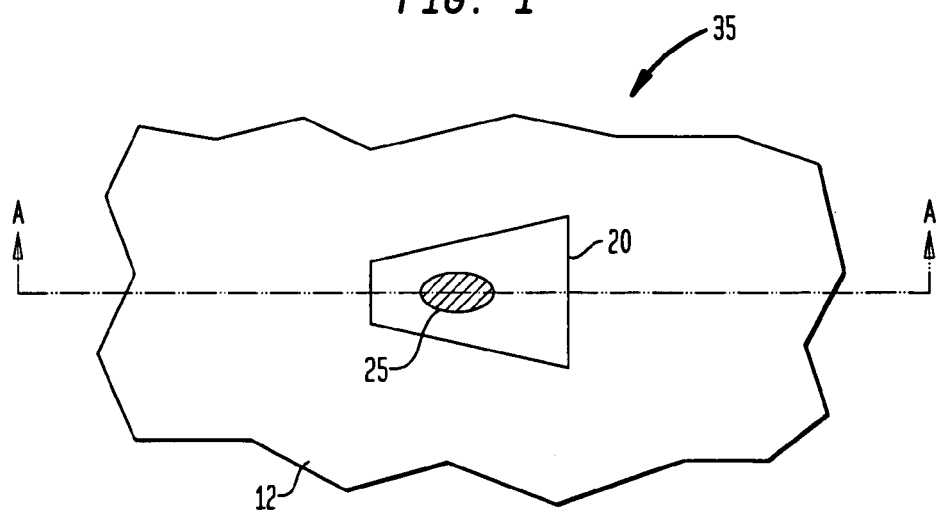
FIG. 1 is a fragmentary plan view of a thermal barrier coated metal part machined according to an embodiment of the present invention.
Figure 2:
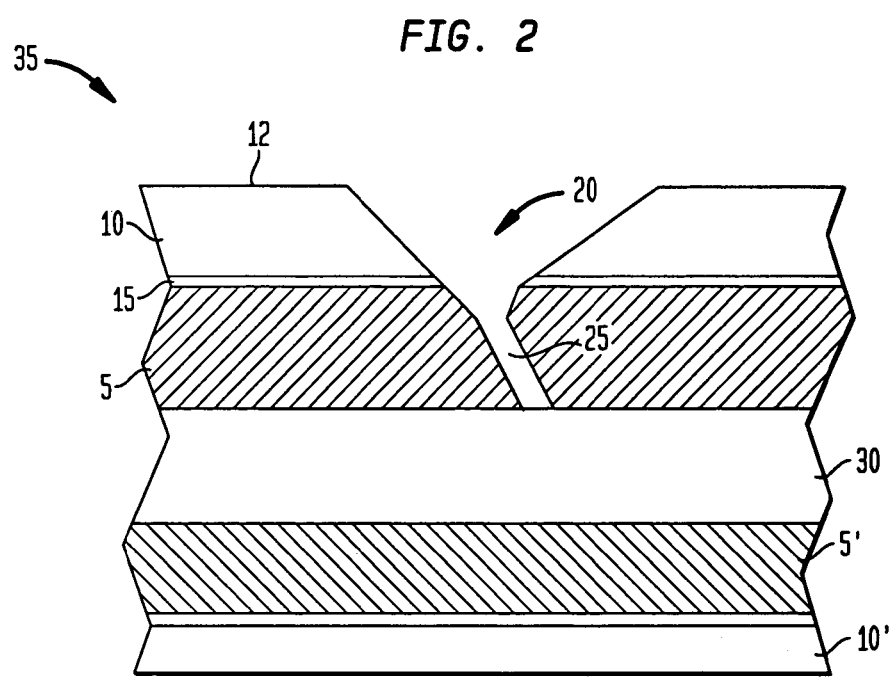
FIG. 2 is a cross-sectional view taken along line A-A in FIG. 1.

FIGS. 1 and 2 show fragmentary views of a ceramic coated turbine blade 35 milled according to an embodiment of the present invention. The ceramic coated turbine blade 35 includes a metal turbine blade 5 having a cooling chamber 30 therein. The metal blade 5 is coated with a bond coat 15, which adheres a ceramic coating 10 to the metal blade 5. A counterbore 20 is milled in the ceramic coating to the metal turbine blade 5. A cooling hole 25 is then milled in the metal turbine blade 5 through the counterbore 20. The cooling hole 25 may extend down to the cooling chamber 30, thus enabling air to flow from the cooling chamber 30 through the cooling hole 25.

The metal blade 5 is typically made from nickel or cobalt based alloy. However, the metal blade 5 may be composed of any metal, including steel, titanium, or carbide. Although the metal blade 5 may vary in shape and size, it generally has several smooth, curved surfaces and ranges in thickness, between an outside surface and the chamber 30, from approximately 0.005 to 0.5 inches.

The cooling chamber 30 in the metal blade 5 is generally over 0.060 inches thick. It may be machined in the metal turbine blade 5 or included when the metal turbine blade 5 is formed.

The bond coat 15 is typically 0.005 to 0.008 inches thick, and may be prepared with a rough surface in order to improve bonding of the ceramic coating 10. The bond coat 15 is typically made from a composition according to the general formula MCrAlX, where M signifies a metallic selection from the group consisting of nickel (Ni), cobalt (Co), or iron (Fe) and X signifies an element selection from the group consisting of yttrium (Y), zirconium (Zr), hafnium (Hf), ytterbium (Yb), or another reactive element. However, bond coats formed from other compositions may be used.

The ceramic coating 10 is commonly 0.005 to 0.030 inches thick and generally composed of zirconia. Other ceramic TBC compositions, for example including tungsten or titanium, may be used.

The counterbore 20 may be created by selectively removing (i.e., milling) a portion of the ceramic coating 10. Although the counterbore 20 is shown as being fan-shaped in FIG. 1, the counterbore 20 may be any shape, such as circular, rectangular, elliptical, trapezoidal, fan-shaped, etc. Moreover, a profile of the counterbore 20 created in the ceramic coating 10 may vary. For example, FIG. 2 shows surfaces of the counterbore 20 as being progressively tapered towards the cooling hole 25, thus forming a profile resembling a V-groove. A slope of the taper may vary, and thus the taper may be virtually non-existent (i.e., the counterbore 20 is the same size or slighter larger than the cooling hole 25). Alternatively, the walls of the counterbore may be nearly parallel to the surface of the ceramic coating 10 (i.e., the opening of counterbore 20 at the outer surface of coating is vast as compared to the cooling hole 25). Furthermore, the counterbore 20 may be more sharply tapered in one portion than in another or it may be tapered to varying degrees around its perimeter. According to another example, the ceramic coating 10 may be contoured so that the profile resembles a round nose, a dado, or a dovetail. According to even further embodiments, the surfaces of the counterbore 20 may be rounded over or given varying slopes in different areas.

The cooling hole 25 may also be any shape and may be formed at any angle. It may be tapered in one or more portions. For example, the cooling hole 25 in FIG. 2 is shown as being tapered in a portion near the ceramic coating 10 and then being bored at a continuous narrow width towards chamber 30. However, similar to the counterbore 20, the cooling hole 25 may be machined with varying angles or curved surfaces or may be bored at a continuous width perpendicular to a top surface of the metal blade 5 or at an angle with respect thereto.

As a variant to the above described embodiment, the ceramic coated turbine blade 35 may actually be a ceramic coated turbine vane, any of a variety of hot gas path turbine parts, or any other metal part. Additionally, the turbine part may be coated with a material other than ceramic. For example, plasma spray, solid/dry film lubricants, fluoropolymer coatings, Teflon® coatings or any other thermal barrier coating may be used.

Figure 3:
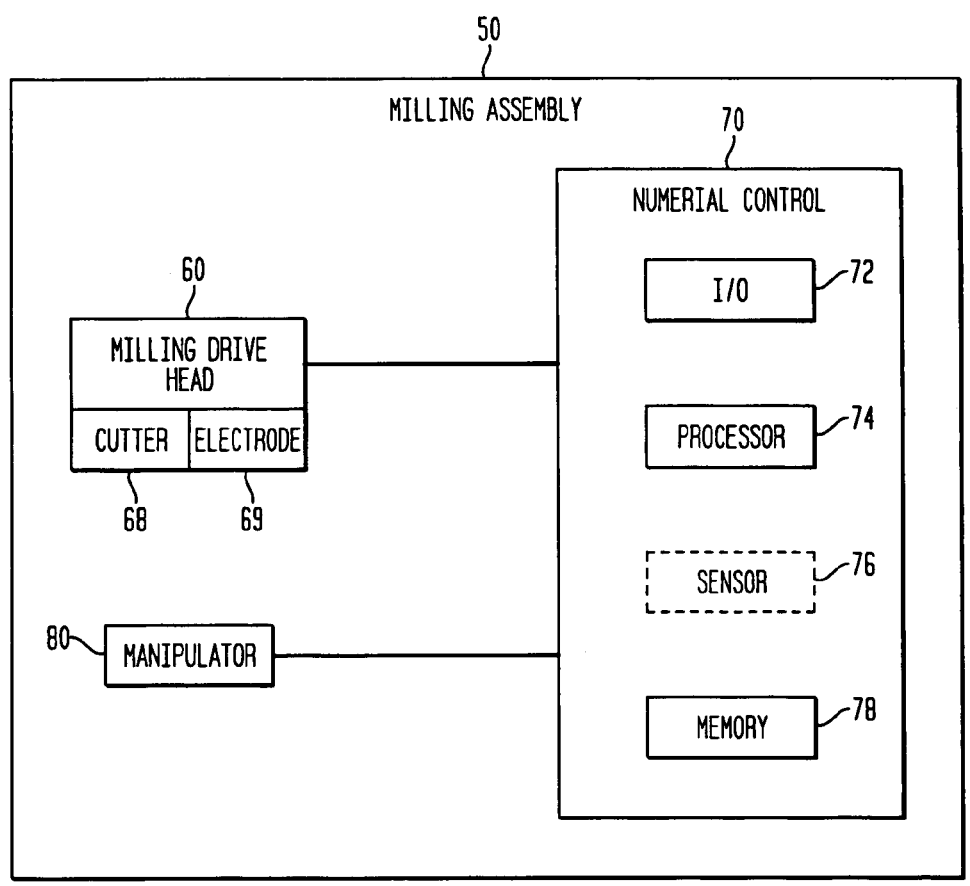
FIG. 3 is a block diagram of a milling assembly according to an embodiment of the present invention.

FIG. 3 shows a milling assembly 50 according to an embodiment of the present invention. The milling assembly 50 includes a numerical control 70 which is electrically connected to a milling drive head 60 and a manipulator 80. The milling drive head 60 is physically mounted on a portion of the manipulator 80.

The milling drive head 60 may be used to perform high speed milling. This milling may be accomplished using mechanical cutter 68 or an electrode 69 for electrical discharge machining (EDM). Thus, for example, the mechanical cutter 68 may be used to mill the ceramic coating and then replaced with the electrode 69 to mill the metal part. The milling drive head is described in greater detail below with respect to FIG. 4.

Manipulator 80 includes a conventional machine tool structure having a fixed element or frame and one or more elements such as slides and pivoting tunnels. The manipulator 80 also includes a vise or other fixture for holding the turbine blade 35. The fixture for holding the blade 35 is mounted to one element of the manipulator structure, whereas the turbine milling head 60 is mounted to another element of the manipulator structure, so that movement of one or both of the elements moves the turbine blade relative to the head or vice-versa.

The numerical control 70 may include an input/output (I/O) interface 72, a processor 74, and a memory 78. The I/O interface 72 may be used to enter data regarding a desired milling operation. For example, a user may enter a depth to which a counterbore 20 or cooling hole 25 is to be drilled. The user may also enter an angle, a shape, or a diameter at which a counterbore 20 or cooling hole 25 is to be drilled.

The processor 74 may compute the entered data and instruct the milling assembly 50 accordingly. For example, the processor 74 may instruct the manipulator 80 to position the turbine blade at a predetermined angle or distance with respect to the milling drive head 60. Further, the processor 74 may instruct the milling drive head 60 to mill according to the entered specifications.

Memory 78 may be used to store preferred machining specifications. For example, a user may input a custom counterbore and cooling hole design. If the user desires to machine numerous holes according to his custom design at a present or later time, the user may store the design specifications in the memory 78.

According to one aspect of the present invention, the numerical control 70 may further include a sensor 76. The sensor 76 may be used to determine when a relevant portion of the ceramic coating 10 is sufficiently removed. Specifically, the sensor 76 may determine electrical conductivity between the milling drive head 60 and the ceramic coated turbine blade being milled. Presence of electrical conductivity may signify that a portion of the metal turbine blade 5 is exposed, or that enough of the ceramic coating 10 has been removed that the metal turbine blade 5 can be machined.

Figure 4:
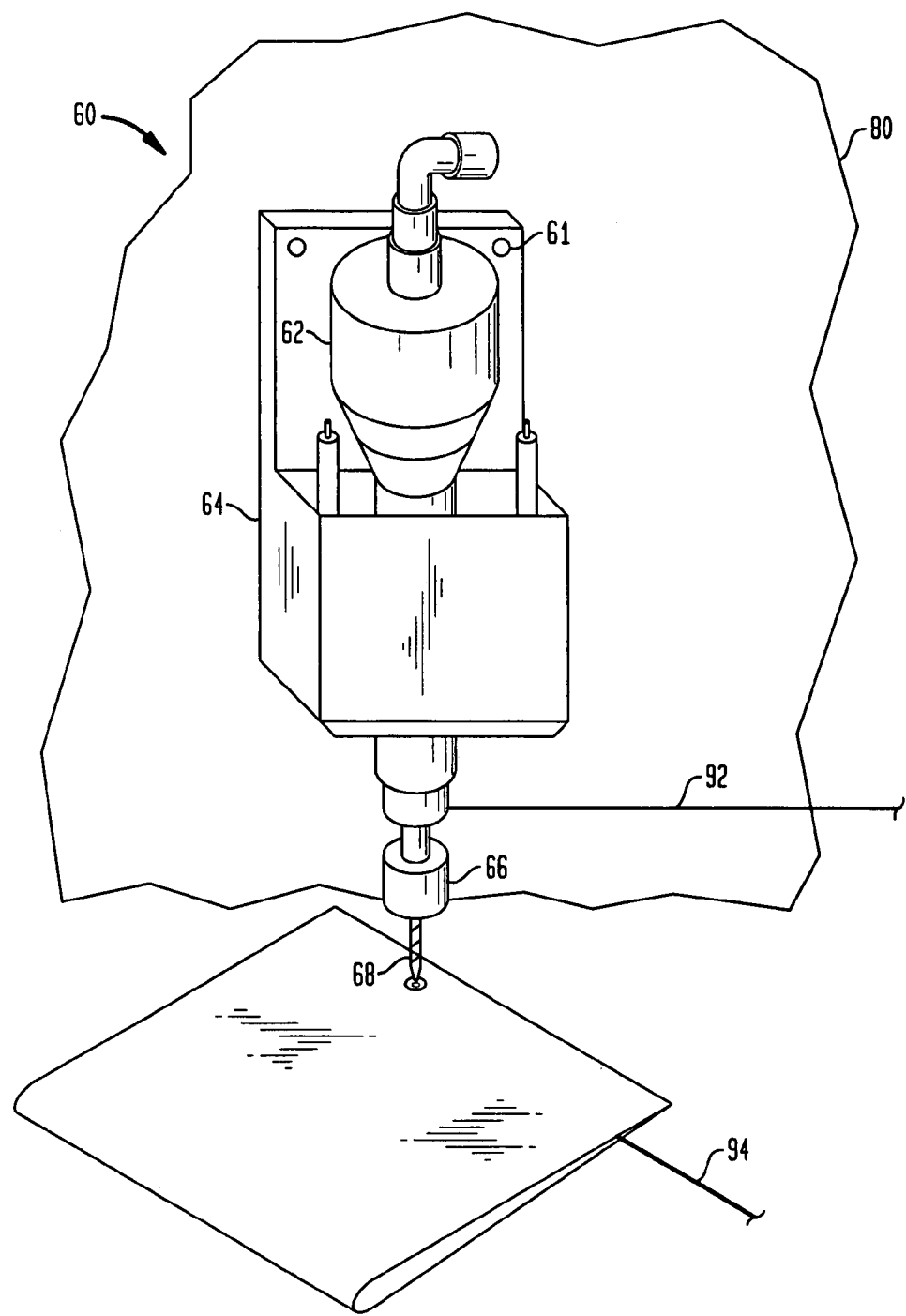
FIG. 4 is a diagrammatic perspective view of a milling drive head used in the embodiment of FIG. 3.

FIG. 4 provides a diagrammatic front view of the milling drive head 60 according to an embodiment of the present invention. The milling drive head 60 may include a support structure 64, which holds a motor and spindle assembly 62. The motor may be electric, hydraulic, pneumatic, or any other type of motor. The milling drive head 60 may be secured to the manipulator 80 by bolts 61 through the support structure 64 and the manipulator 80. The motor and spindle assembly 62 may have a shaft, an end of which may be connected to a collet 66. The collet 66 holds a mechanical cutter 68, which may be used for milling the ceramic coating 10. The collet 66 and mechanical cutter 68 may be replaced with the EDM electrode 69, which may be used to mill the metal blade 5. Alternatively, the entire milling drive head 60 may be removed and replaced with an alternative drive head. Thus, different milling tools may be used to perform the milling of the ceramic coating and the milling of the metal turbine blade 5. In this regard, an optimal tool may be selected for milling each layer, while the turbine blade remains held by the manipulator 80.

FIG. 4 further shows a configuration where leads 92 and 94 are connected to the drilling head 60 and the coated turbine blade 35 respectively. These leads 92, 94 may be further connected to the sensor 76.

The mechanical cutter 68 may be any of a variety of types, such as an end mill, a rotary burr, or an abrasive point. Furthermore, according to some embodiments of the present invention the mechanical cutter 68 may include carbide, nitride, tool steel, high speed steel, diamond, cubic boron nitride, tungsten carbide or other suitable abrasive or cutting materials. For example, the cutter 68 may be diamond coated to preserve its sharpness and prolong usability.

The drilling head 60 may operate at high speeds. For example, the spindle and motor assembly 62 may operate at speeds up to 60,000 RPM or higher. Linear feed rates, defining translational movement of the mechanical cutter 68 with respect to the ceramic coating 10, may range from 0.004 inches per minute to 60 inches per minute or higher.

The milling drive head 60 may be secured to the manipulator 80 by any of a variety of other means. For example, bolts 61 may be replaced with clamps, chucks, or quick disconnect fittings.

Figure 5:
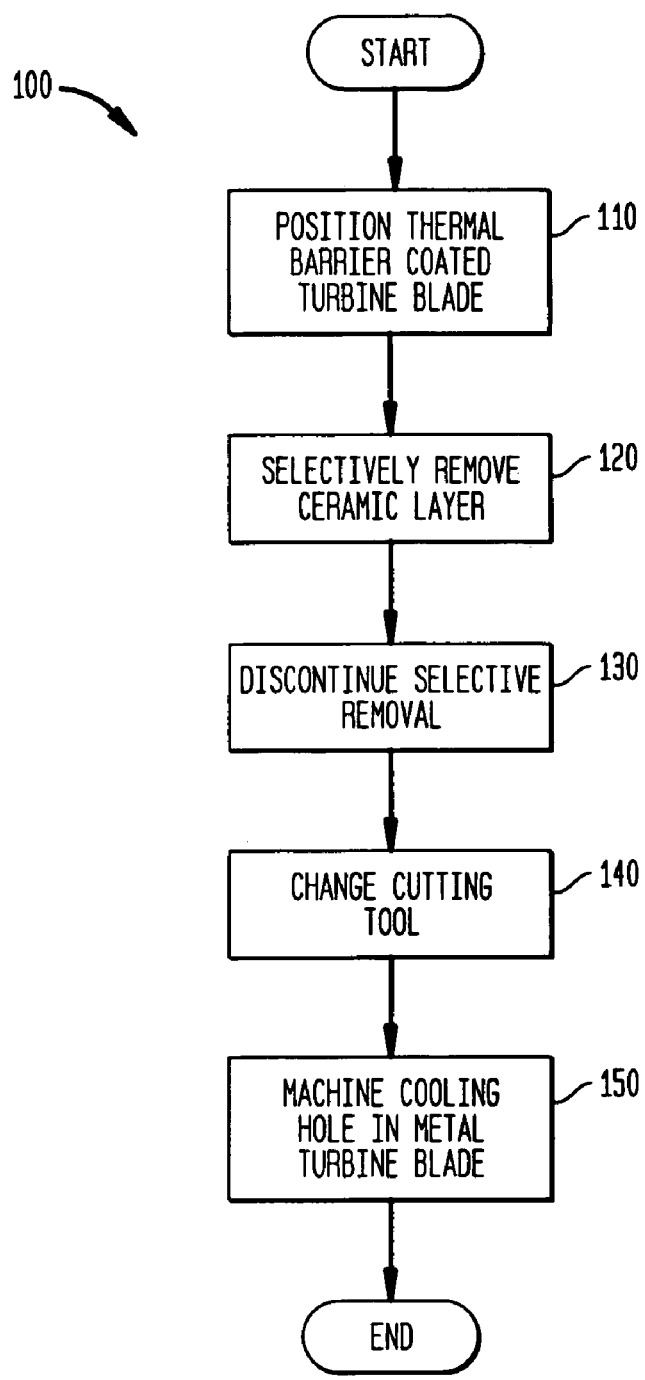
FIG. 5 is a method according to an embodiment of the present invention.
Figure 6:
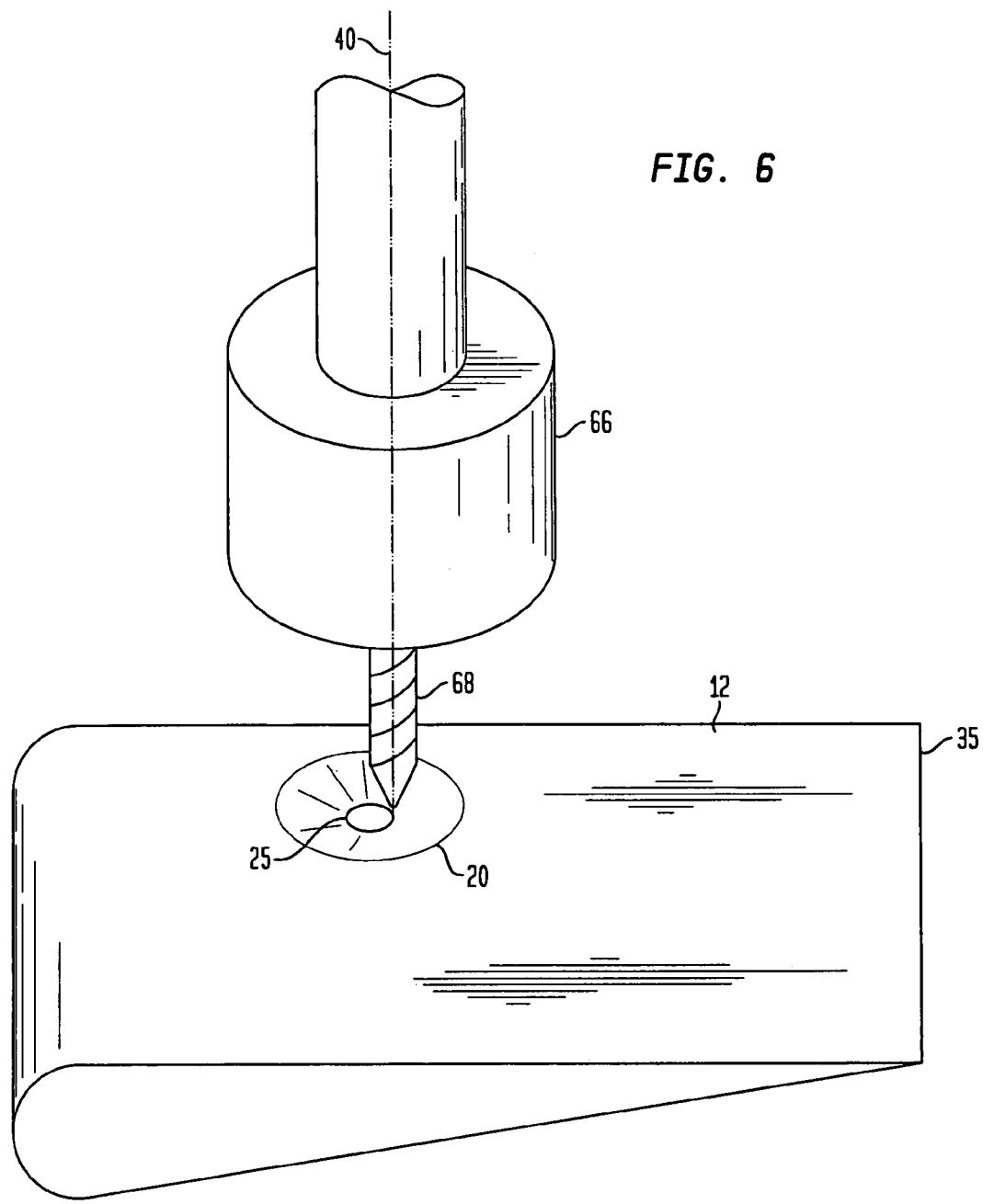
FIG. 6 is a perspective view of a cutter machining a part according to an embodiment of the present invention.
Figure 7:
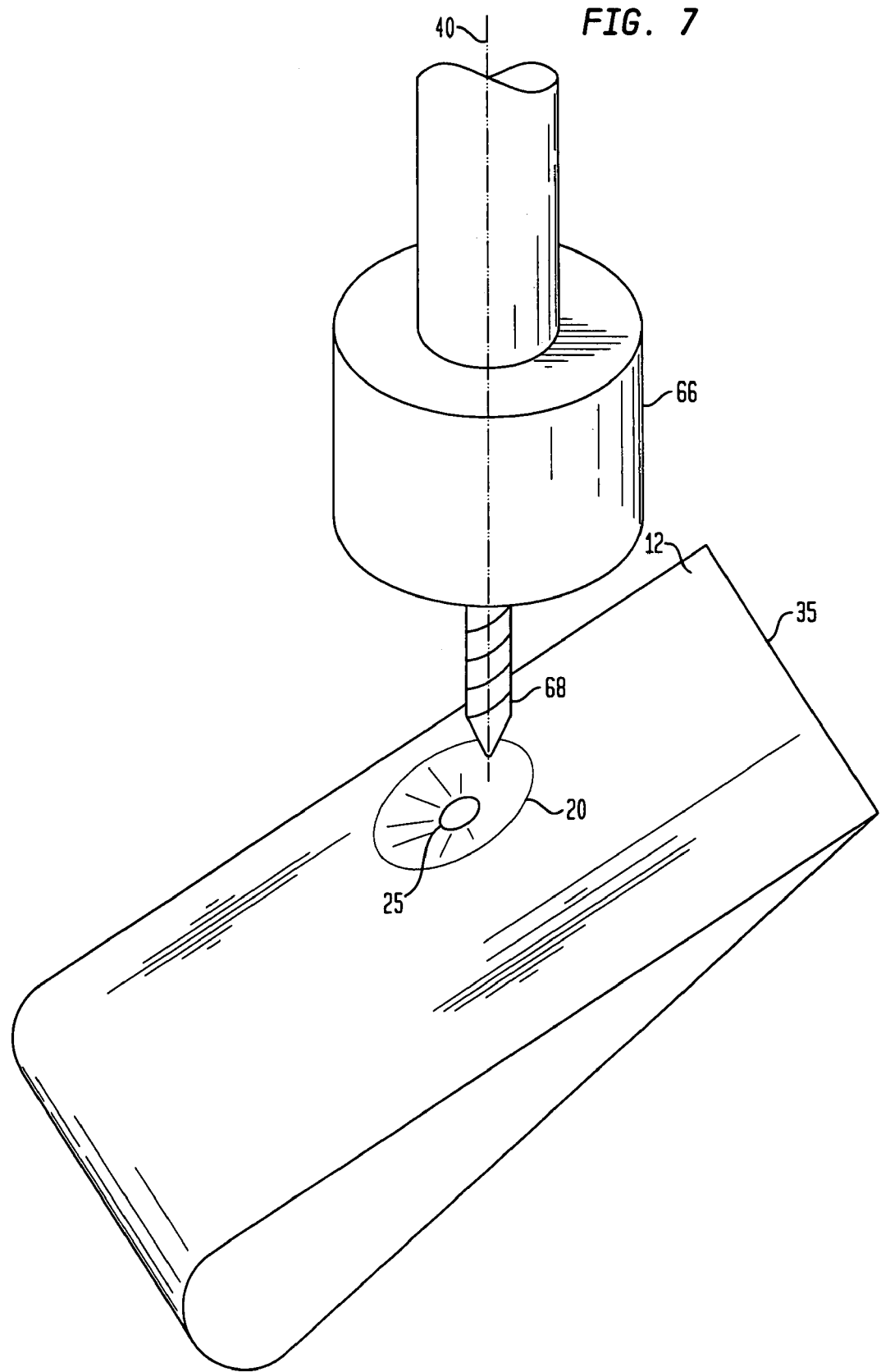
FIG. 7 is a perspective view of a cutter machining a part according to another embodiment of the present invention.
Figure 8:
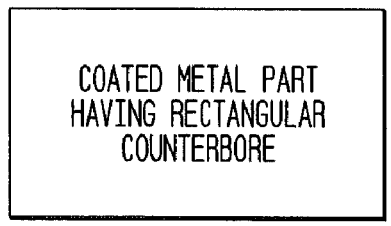
FIG. 8 is a schematic representation of a workpiece having a rectangular counterbore.
Figure 9:
FIG. 9 is a schematic representation of a workpiece having an elliptical counterbore.

FIG. 5 illustrates a method 100 of milling a thermal barrier coated turbine blade 35 according to an embodiment of the present invention. In step 110, a ceramic coated turbine blade 35 is held in a predetermined position by manipulator 80. This position may place the top surface 12 of the coated blade 35 approximately normal to a vertical axis 40 of the mechanical cutter 68 as shown in FIG. 6. Alternatively, this position may place the top surface 12 of the coated blade 35 oblique with respect to the vertical axis 40 as shown in FIG. 7. As mentioned above, positioning may be performed by the manipulator 80, and controlled either manually or by the numerical control 70.

In step 120, the ceramic coating 10 is selectively removed by the mechanical cutter 68 of the milling drive head, thereby forming counterbore 20. Selective removal may be discontinued (step 130) when, for example, the counterbore 20 is completed.

For example, as the ceramic coating 10 is selectively removed, the electrical conductivity between the cutter 68 and the metal blade 5 is continually checked using the sensor 76 (FIG. 3) and leads 92 and 94 (FIG. 4). If no electrical conductivity is detected, selective removal of the ceramic coating 10 is continued. However, if electrical conductivity is sensed, selective removal may be discontinued in response.

According to another example, completion of the counterbore 20 may be determined by measuring a mechanical deflection of the drilling head 60. That is, measuring the deflection of the drilling head 60 may enable one to detect a quantity of coating 10 that has been removed.

In step 140, the mechanical cutter 68 may be replaced. For example, it may be exchanged for the electrode 69 or an alternative mechanical cutting tool. The new cutting tool may be used to machine the cooling hole 25 in the metal turbine blade 5 (step 150).

According to an aspect of the present invention, positioning of the turbine blade 35 may occur throughout the method 100. Thus, although the blade 35 is initially positioned in step 110, it may be repositioned during selective removal of the ceramic layer and machining of the cooling hole 25 in the metal blade 5. Thus, the counterbore 20 and cooling hole 25 may be of any shape and may include various angles. Also, the manipulator 80 may vary the angle between the axis of the cutter and the surface during the process.

As a variant to the method 100, the step of replacing the cutting tool may include the step of replacing the drilling head 60 with a different machine head after discontinuing selective removal of the ceramic layer in step 140. For example, as opposed to merely replacing the mechanical cutter 68 with the electrode 69, the entire drill head 60 may be replaced with a machine head for electrical discharge machining (EDM) or electro chemical machining (ECM).

Discontinuance of the selective removal in step 130 may occur upon sensing of electrical conductivity or immediately thereafter. Alternatively, selective removal may be discontinued a predetermined period of time after electrical conductivity is sensed. According to another embodiment, selective removal may be continued until the electrical conductivity reaches a predetermined strength.

The step of detecting electrical conductivity can be replaced or supplemented by a step of determining whether a predetermined depth has been reached. For example, if a thickness of the ceramic coating 10 is known, it may be input by a user to the numerical control 70. Thus when the ceramic coating 10 has been milled to a depth approximately equal to the thickness input by the user, the milling assembly 50 may discontinue milling.

Although in the above described embodiment, milling is largely performed by the numerical control 70, all or part of the milling process may alternatively be performed manually. For example, the manipulator 80 may be manually operated to position the thermal barrier coated turbine blade 35 with respect to a vertical axis of the mechanical cutter 68 or the electrode 69.

In another variant, completely different machines having different drive heads may be used to mill the ceramic coating 10 and the metal turbine blade 5. Conversely, another aspect of the present invention enables the entire thermal barrier coated turbine blade 35, including the metal blade 5 and the ceramic coating 10, to be milled by the drive head 60 and cutter 68.

Although the invention herein has been described with reference to particular embodiments, it is to be understood that these embodiments are merely illustrative of the principles and applications of the present invention. For example, although the above described method and apparatus for machining has been described with respect to milling cooling holes in ceramic coated turbine blades, this method and apparatus may be applied to any metal part having a thermal barrier coating. It is therefore to be understood that numerous modifications may be made to the illustrative embodiments and that other arrangements may be devised without departing from the spirit and scope of the present invention as defined by the appended claims.

The invention claimed is:

1. A method for milling a thermal barrier coated metal part, comprising:
    selectively mechanically removing a portion of a ceramic coating using a rotating mechanical cutting tool, thereby forming a counterbore; and
    non-mechanically machining the metal part through the counterbore using a non-mechanical machining tool.

2. The method of claim 1, further comprising controlling the cutting tool by a numerical control.

3. The method of claim 2, in which the controlling step includes discontinuing the step of selectively removing the portion of the ceramic coating at a predetermined depth.

4. The method of claim 2, further comprising detecting electrical conductivity between the mechanical cutting tool and the metal part in an area where the ceramic coating was selectively removed.

5. The method of claim 4, further comprising discontinuing the step of selectively removing the ceramic coating in response to the detecting of the electrical conductivity.

6. The method of claim 1, wherein a shape of the counterbore is one of rectangular, circular, elliptical, and trapezoidal.

7. The method of claim 1, wherein the step of selectively removing the ceramic coating includes operating the cutting tool about an axis of the cutting tool.

8. The method of claim 7, wherein the axis of the cutting tool is oblique to a surface of the thermal barrier coated metal part at a point where the ceramic coating is being selectively removed.

9. The method of claim 8, further comprising varying a degree of obliqueness between the axis of the cutting tool and the surface of the thermal barrier coated metal part.

10. The method of claim 1, wherein the step of selectively removing a portion of the ceramic coating includes using a mechanical cutting tool that includes carbide.

11. The method of claim 1, wherein the step of selectively removing a portion of the ceramic coating includes using a mechanical cutting tool that includes diamond.

12. The method of claim 1, wherein the step of selectively removing a portion of the ceramic coating includes using a mechanical cutting tool that includes nitride.

13. The method of claim 1, wherein the step of selectively removing a portion of the ceramic coating includes using a mechanical cutting tool that includes steel.

14. The method of claim 1, wherein the cutting tool used to selectively remove the ceramic coating is one of a rotary burr, an end mill, or an abrasive point.

15. The method of claim 1, wherein the step of machining the metal part through the counterbore is performed using electrical discharge machining.

* * * * *

UNITED STATES PATENT AND TRADEMARK OFFICE
CERTIFICATE OF CORRECTION

| | | |
|---|---|---|
| PATENT NO. | : 7,992,272 B2 | Page 1 of 1 |
| APPLICATION NO. | : 11/807582 | |
| DATED | : August 9, 2011 | |
| INVENTOR(S) | : Joseph W. Janssen and John Malek | |

It is certified that error appears in the above-identified patent and that said Letters Patent is hereby corrected as shown below:

On the cover page, under Inventors:, "Lambertville" should read --Parsippany--.

On the cover page, under Inventors:, "Old Bridge" should read --Parsippany--.

Signed and Sealed this
Fourteenth Day of August, 2012

David J. Kappos
*Director of the United States Patent and Trademark Office*